Aug. 19, 1930. A. HAPPE 1,773,267
FRUIT AND LIKE PEELER
Filed Oct. 1, 1927
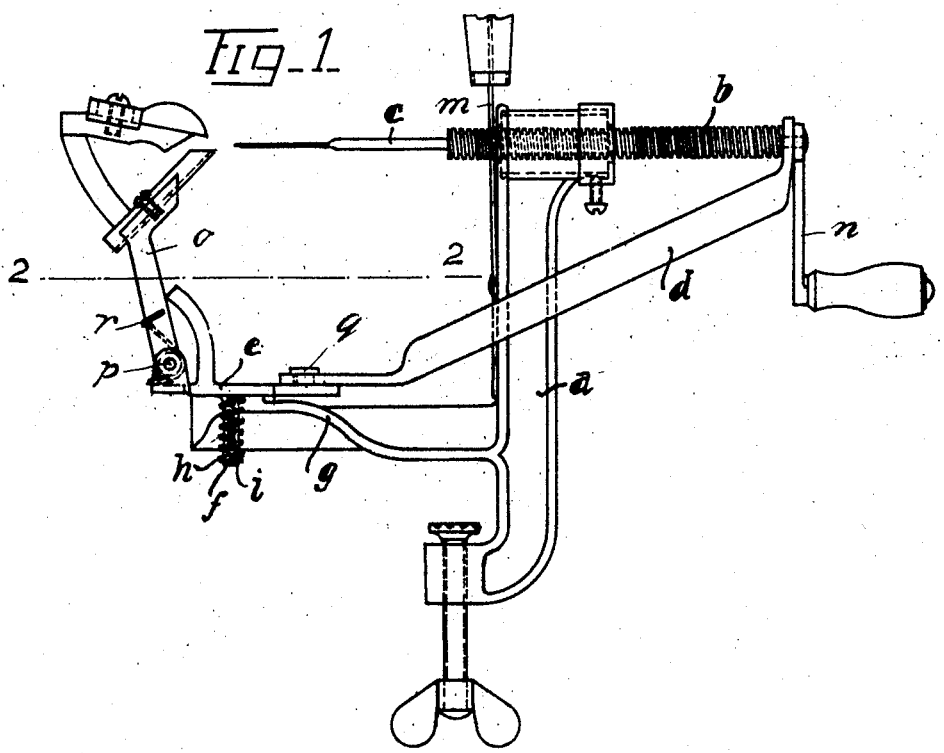
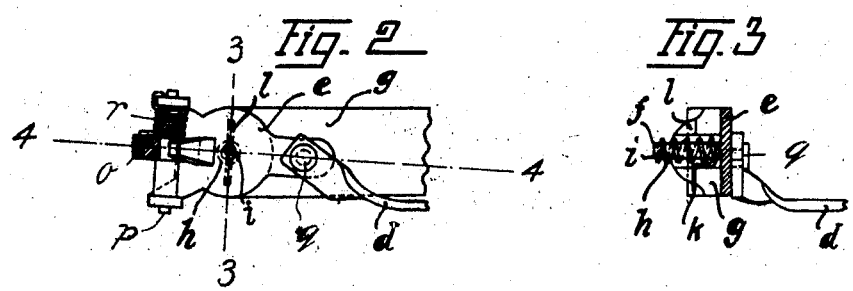
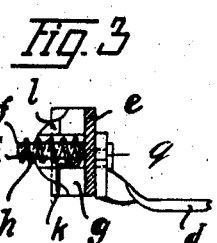
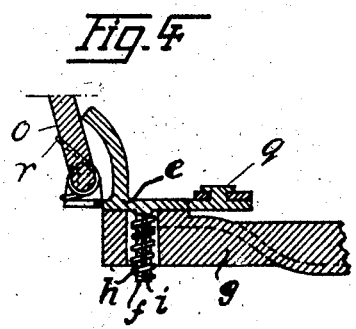
Inventor:
August Happe Patented Aug. 19, 1930

1,773,267

UNITED STATES PATENT OFFICE

AUGUST HAPPE, OF NIEDER-VAHLEFELD, NEAR HALVER, GERMANY, ASSIGNOR, BY MESNE ASSIGNMENTS, TO GUARANTY PRODUCTS COMPANY, OF ST. LOUIS, MISSOURI

FRUIT AND LIKE PEELER

Application filed October 1, 1927. Serial No. 223,398.

This invention relates to a device for peeling fruit, potatoes and the like and of the kind wherein the fruit is turned and advanced by means of a screw spindle relative to an oscillatory cutter arm mounted on a swivelled support which is turned by means of a rod connecting it with the screw-spindle, and the invention consists in providing the support with a spring adapted to restore it and the spindle to their initial positions when the screw-spindle is released in known manner from its nut element.

Fig. 1 of the accompanying drawings represents a side view of the device,

Fig. 2, a section on the line 2—2 of Fig. 1,

Fig. 3, a section on the line 3—3 of Fig. 2, and

Fig. 4, a section on the line 4—4 of Fig. 2.

The device consists of a frame a which is adapted to be attached by means of a clamp screw to a table top or the like. A screw-spindle b is held in a socket in the frame so that it can be moved therein in a slidable manner, and a nut element is held by a pivoted hand lever m so that it can be applied radially to the spindle for controlling the same and removed so as to allow the spindle to slide. The spindle is fitted at one end with a crank handle n and carries at the other end a spear c to which the fruit or the like is applied so that it can be turned and advanced by means of the screw-spindle. A peeling cutter is mounted in an arm o which is carried by a swivelled support e and adapted to oscillate about a pivot p. A crank pin q on the support e is connected by means of a rod d to the screw-spindle so that axial displacement of the latter will cause the support e to turn for adjusting the oscillating plane of the arm o in proportion to the advance of the fruit. A spring r acts on the arm so as to hold the cutter against the fruit and cause it to follow the undulations of the same.

According to the invention, the pivot pin f which holds the support e is embraced by a coil spring h one end i of which is secured to the pin while the other end k is engaged in a slit l in the carrier bracket g. This spring tends to maintain the cutter in the starting position which is substantially in alignment with the spear c, and on the spindle b being released from its nut element at the end of the peeling operation, the spring automatically restores the elements to the starting position.

I claim:

1. In a fruit or like peeling device of the character described, the combination with an oscillatory cutter arm, a swivelled support for said arm, a screw-spindle for turning and advancing the fruit relative to the cutter arm, a rod connecting the spindle with said support so as to turn it under the influence of the axial movement of the spindle, and means for releasing the spindle from its screw control, of a spring controlling said support so as to restore it and the spindle to their initial positions when the spindle is released.

2. A fruit and like peeling device of the character described, comprising in combination a frame, an oscillatory cutter arm, a support for said arm, a pivot pin holding the support in said frame so that it can be turned for adjusting the oscillating plane of the arm, a screw-spindle mounted in said frame for turning and advancing the fruit relative to the cutter arm, the nut element for said spindle being radially detachable for releasing the spindle, a rod connecting the spindle with said support so as to turn the latter owing to the axial movement of the spindle, and a coil spring connected at one end to said pivot pin and at the other end to the frame so as to oppose the movement of the support and restore it and the spindle to their initial positions when the spindle is released from the nut element.

3. A paring device comprising a support, a rotatable plate with an arm swinging thereon, a knife on the arm, a fender on the arm to determine the depth of the cut by the knife, a screw-threaded rod for holding the article to be pared, means for rotating the rod whereby it is advanced, a connection from the rod to the plate and a nut movable laterally from the rod to permit the quick return thereof, and a spring to return the rod and the rotatable plate when the nut is released.

AUGUST HAPPE.